United States Patent
Rosseel

(10) Patent No.: US 6,499,500 B2
(45) Date of Patent: Dec. 31, 2002

(54) MOTOR VEHICLE FUEL TANK

(75) Inventor: Alexis Rosseel, Compiegne (FR)

(73) Assignee: Compagnie Plastic Omnium, Lyons (FR)

( * ) Notice: Subject to any disclaimer, the term of this patent is extended or adjusted under 35 U.S.C. 154(b) by 84 days.

(21) Appl. No.: 09/835,490

(22) Filed: Apr. 17, 2001

(65) Prior Publication Data

US 2002/0000252 A1 Jan. 3, 2002

(30) Foreign Application Priority Data

Apr. 20, 2000 (FR) .............................. 00 05098

(51) Int. Cl.⁷ .............................................. F16K 24/04
(52) U.S. Cl. ..................... 137/15.17; 137/202; 137/587
(58) Field of Search ................ 137/15.17, 43, 137/202, 587; 123/509, 516

(56) References Cited

U.S. PATENT DOCUMENTS

| | | | | |
|---|---|---|---|---|
| 3,910,302 A | * | 10/1975 | Sudhir | 137/43 |
| 4,304,530 A | | 12/1981 | Gens | |
| 4,716,931 A | * | 1/1988 | Shibamoto | 123/509 X |
| 4,799,504 A | * | 1/1989 | Scragg et al. | 137/38 |
| 4,958,655 A | * | 9/1990 | Danek | 137/202 X |
| 4,989,629 A | * | 2/1991 | Shirakawa | 137/202 |
| 5,277,217 A | * | 1/1994 | Kobayashi et al. | 137/202 X |
| 5,711,339 A | * | 1/1998 | Kurihara | 137/43 |
| 5,954,083 A | * | 9/1999 | Hattori | 137/202 |
| 6,062,250 A | * | 5/2000 | Takahashi | 137/202 |

FOREIGN PATENT DOCUMENTS

| | | |
|---|---|---|
| DE | 30 18 242 A1 | 11/1981 |
| EP | 0 875 411 A2 | 11/1998 |

* cited by examiner

*Primary Examiner*—John Rivell
(74) *Attorney, Agent, or Firm*—Oliff & Berridge, PLC

(57) ABSTRACT

A motor vehicle fuel tank comprising a shell and inside the shell at least one add-on element such as a valve. Said shell presents a portion in relief and an add-on element is connected to the shell by means of an intermediate element having at least one elastically-deformable portion arranged to be connected after elastic deformation in or on said portion in relief, so as to hold the intermediate element to the shell. The add-on element is arranged to be connected to the intermediate element in such a manner as to prevent the elastically-deformable portion of the intermediate element from being subjected to inverse elastic deformation enabling it to become disengaged from said portion in relief.

30 Claims, 5 Drawing Sheets

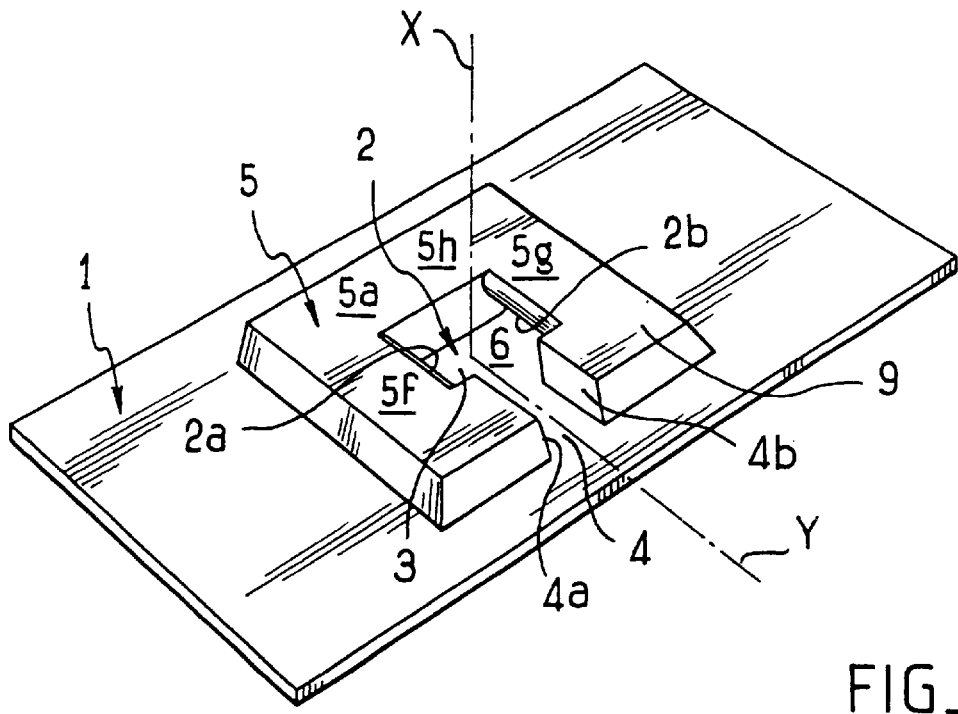
FIG_7
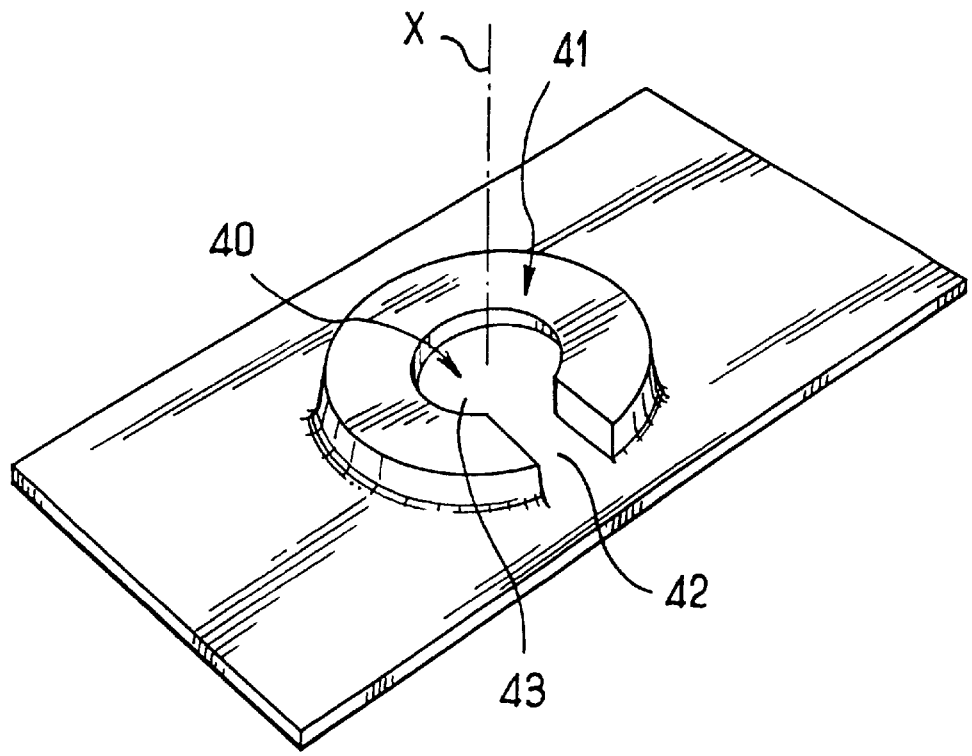
FIG_8

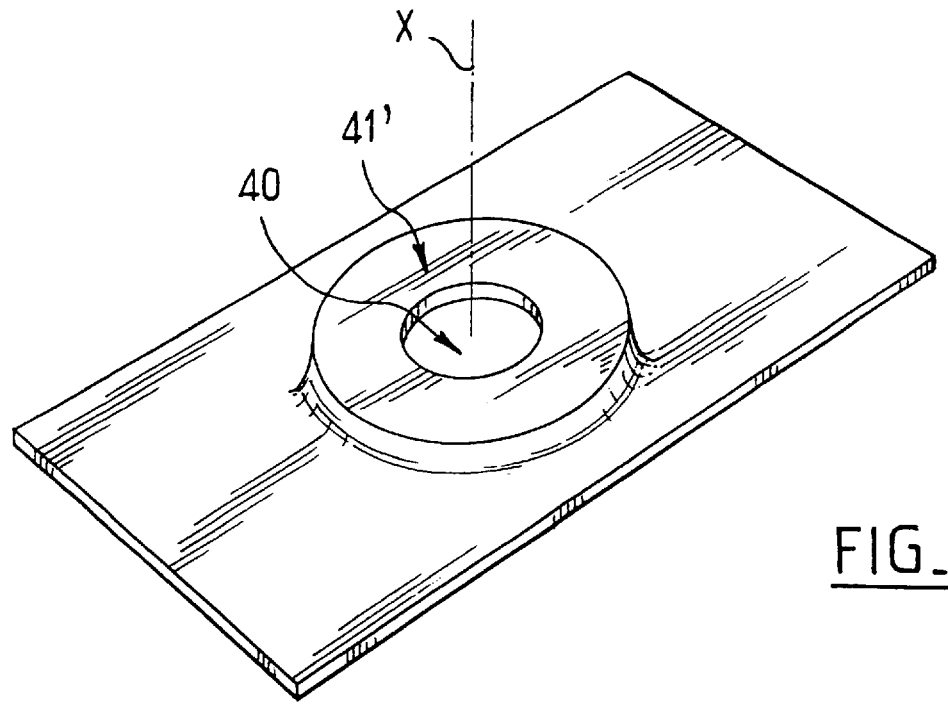
FIG_9
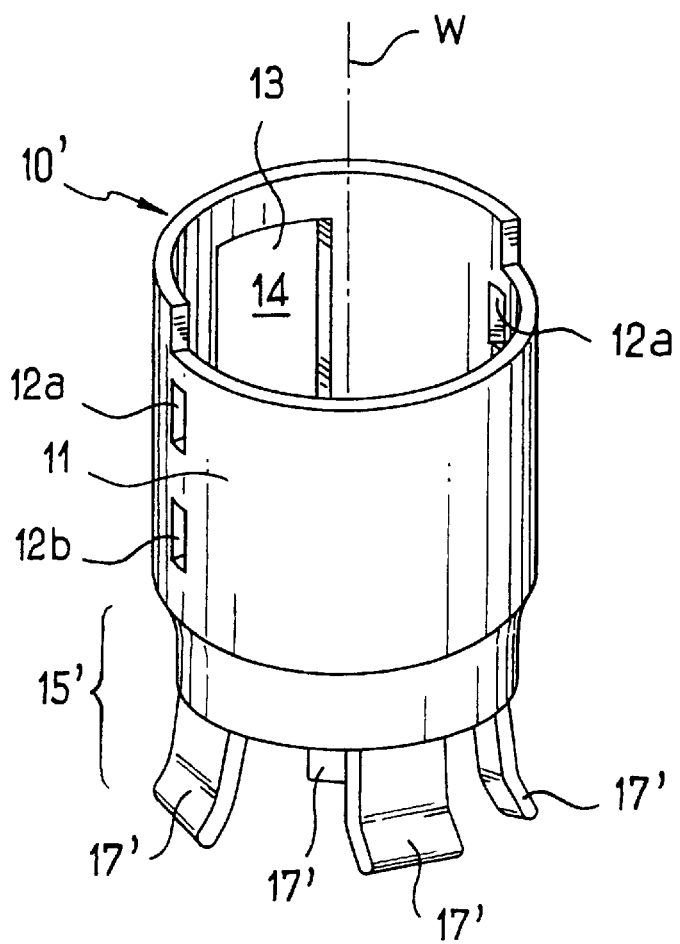
FIG_10

MOTOR VEHICLE FUEL TANK

BACKGROUND OF THE INVENTION

It is known to make a fuel tank with a shell of thermoplastic material that is blown, thermoformed, or rotormolded, for example.

Such a shell can include a layer that forms a barrier against hydrocarbons so as to limit hydrocarbon losses by diffusion through the shell.

Such a barrier-forming layer can be made of ethylene-vinyl alcohol copolymer (EVOH).

There exists a need to secure elements, such as a valve for venting air or degassing, for example, on the inside face of the shell of the tank, regardless of whether or not the shell includes a barrier-forming layer.

Where appropriate, this should be done without damaging the barrier-forming layer.

In addition, the reliability of such a connection must be guaranteed throughout the lifetime of the tank, in spite of the vibrations to which the tank is subjected and any dimensional variations to which the shell might be subjected in particular under the effect of the thermoplastic material swelling on contact with hydrocarbons.

OBJECTS AND SUMMARY OF THE INVENTION

The present invention seeks to provide a reliable connection.

The invention achieves this by a novel motor vehicle fuel tank comprising a shell, and inside the shell at least one add-on element such as a valve, wherein the shell presents a portion in relief, wherein the add-on element is connected to the shell by means of an intermediate element including at least one elastically-deformable portion arranged to engage, after being elastically-deformed, in or on said portion in relief so as to hold the intermediate element to the shell, and wherein the add-on element is arranged so as to be connected to the intermediate element in such a manner as to prevent the elastically-deformable portion of the intermediate element from being subjected to inverse elastic deformation enabling it to become disengaged from said portion in relief.

The elastically-deformable portion of the intermediate element is held in a predetermined position when the add-on element is secured to the intermediate element, and while held in this way it prevents any displacement of the intermediate element in a direction leading to disengagement of the portion in relief of the shell of the tank.

The invention thus makes it possible to provide a locking system that is effective on securing the intermediate element in or on the portion in relief of the shell of the tank, and consequently of ensuring that the add-on element is held in stable manner.

In a preferred embodiment, it defines a housing in which the elastically-deformable portion of the intermediate element is suitable for being engaged.

Still in a particular embodiment, the above-mentioned housing communicates with a lateral passage enabling a lateral extension of the intermediate element or of the add-on element to be received.

This makes it possible to establish a keying system to guarantee that the add-on element is in a predetermined orientation once it has been secured to the shell of the tank.

In addition, where appropriate, the tank can be made more compact by reducing the axial extent of the add-on element, since the above-mentioned passage makes it possible to bring the portion of the add-on element constituting the above-mentioned lateral extension into the vicinity of the shell of the tank.

This embodiment also makes it possible to secure the add-on element substantially at the highest point of the tank, which is particularly advantageous when the add-on element is an air vent or degassing valve.

In a particular embodiment, the lateral extension in question is constituted by an endpiece for connection to a pipe.

The passage receiving the endpiece is then advantageously defined by walls that are substantially parallel to the axis thereof.

Still in a particular embodiment, the opening of the housing through which the intermediate element is inserted is not circularly-symmetrical, thus making it possible to secure the intermediate element in a predetermined angular position once it is engaged in the housing. In a variant, said opening can be circularly-symmetrical.

In a particular embodiment, the intermediate element is arranged to snap-fasten in the housing in the axial direction thereof.

The intermediate element can thus have elastically-deformable fastening tabs suitable for snap-fastening in the above-mentioned housing.

The intermediate element can thus be secured to the shell of the tank in a manner that is simple and fast.

In a particular embodiment, the intermediate element has at least two resilient tabs leaving a gap between them and arranged so as to snap-fasten in the housing formed by the shell of the tank, the add-on element including a locking portion suitable for engaging in said gap in such a manner as to prevent the tabs from moving towards each other and disengaging from the housing.

This embodiment is advantageous because the shell of the tank is likely to be subjected to variations in its dimensions over its lifetime.

In the absence of the above-mentioned locking portion, there would be a risk of the tabs disengaging from the housing in which they have been inserted.

In a particular embodiment, the intermediate element has two pairs of resilient tabs, each pair being disposed facing the other, the tabs in a given pair being disposed in such a manner as to come into contact with the same face of the housing.

In a variant, the intermediate element extends along a longitudinal axis and has a plurality of resilient tabs disposed at equal angular intervals around said longitudinal axis.

Still in a particular embodiment, the housing has an axial section of dovetail shape and the tabs are of flattened shape being angled outwards so as to fit substantially to the shape of the inside faces of the housing.

This configuration makes it possible to have a large bearing area for the resilient tabs and the inside faces of the housing, thereby improving the reliability of the connection.

Advantageously, the add-on element is arranged to snap-fasten on the intermediate element.

In a particular embodiment, the intermediate element has a tubular body with an elastically-deformable portion at one end for engaging in the above-mentioned housing, and the add-on element is arranged to connect to the inside of said tubular body.

The intermediate element and the add-on element preferably include portions in relief arranged to co-operate so as to enable the add-on element to be preassembled in the intermediate element before the intermediate element is connected to the shell of the tank.

Advantageously, the tubular body of the intermediate element has recesses and the add-on element has teeth suitable for snap-fastening in the recesses.

Preferably, the intermediate element has a first set of recesses disposed in such a manner as to enable the add-on element to be held in a first position relative to the intermediate element suitable for enabling the intermediate element to be put into place on the shell of the tank, and a second set of recesses enabling the add-on element to be held in the intermediate element in a second position relative to the intermediate element, said second position of the add-on element preventing the intermediate element from becoming detached from the shell of the tank.

This enables the add-on element to be connected in simple and low cost manner inside the intermediate element.

In a particular embodiment, the add-on element has an endpiece and the tubular body of the intermediate element has a window for passing said endpiece.

Advantageously, the window is set back from the end of the tubular body situated remote from the elastically-deformable portion.

Thus, the intermediate element retains good mechanical strength because of the strip of material situated between the above-mentioned window and the end of the tubular body.

In a particular embodiment, the shell is made by blowing a thermoplastic material. Advantageously, the shell then has at least one layer that forms a barrier against hydrocarbons.

In a particular. embodiment, the portion in relief for connecting the intermediate element is obtained by means of a predetermined shape being given to the blow mold.

In a variant, the portion in relief is obtained by overmolding an insert.

This embodiment is advantageous since the insert can form reinforcement opposing possible changes in the dimensions of the shell.

Also in a variant, the portion in relief can be obtained by fitting a fastener on the surface of the shell, which fastener can be heat-sealed to said surface.

By way of example, the add-on element is constituted by a valve or a check valve.

The invention also provides a method of manufacturing a motor vehicle fuel tank, the method comprising the following steps:

a) making a shell by shaping a plastics material, in particular by blowing, thermoforming, rotomolding, or injection molding a thermoplastic material;

b) making a portion in relief on the shell, during or after formation of the shell;

c) connecting an intermediate element to said portion in relief, the intermediate element being provided with at least one elastically-deformable portion arranged to engage by resilient deformation in or on said portion in relief so as to hold the intermediate element to the shell; and d) connecting an add-on element to the shell of the tank at the same time as the intermediate element or thereafter, said add-on element being suitable for preventing the elastically-deformable portion of the intermediate element from moving in such a manner as to enable it to become disengaged from said portion in relief.

After the intermediate element has been put into place on its own on the shell of the tank, the add-on element can be connected to the intermediate element to prevent the elastically-deformable portion of the intermediate element moving in such a way as to enable it to disengage from the portion in relief.

In a variant, the add-on element can be preassembled to the intermediate element before the intermediate element is put into place on the portion in relief, the intermediate element can then be connected to the portion in relief, and finally the add-on element can be moved relative to the intermediate element in such a manner that the add-on element prevents the elastically-deformable portion of the intermediate element from moving in such a way as to enable it to disengage from the portion in relief.

BRIEF DESCRIPTION OF THE DRAWINGS

Other characteristics and advantages of the present invention will appear on reading the following detailed description of non-limiting embodiments, and on examining the accompanying drawings, in which:

FIG. 7 is a fragmentary diagrammatic view in perspective of the shell of the tank with a housing constituting a second embodiment of the invention;

FIG. 8 is a diagrammatic and fragmentary view in perspective of a shell of a tank presenting a housing constituting a third embodiment of the invention;

FIG. 9 shows a variant embodiment of the FIG. 8 housing; and

FIG. 10 is a diagrammatic perspective view showing a variant embodiment of the intermediate element of FIG. 2.

MORE DETAILED DESCRIPTION

Figure 1:
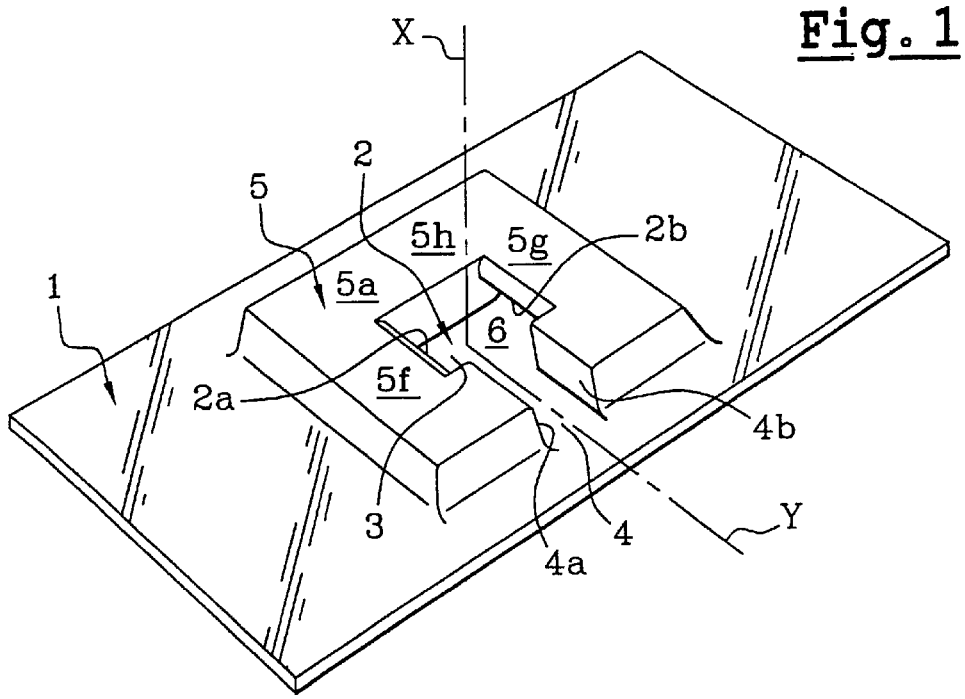
FIG. 1 is a diagrammatic fragmentary perspective view of a tank shell having a housing constituting a first embodiment of the invention.

FIG. 1 shows a portion of a shell 1 constituting the wall of a motor vehicle fuel tank.

This shell 1 is obtained in this shell by blowing a paraison, and it presents a multilayer structure made up in succession of a first thermoplastic layer, e.g. of high density polyethylene, a layer that forms a barrier against hydrocarbons, e.g. EVOH, and a second thermoplastic layer, e.g. high density polyethylene.

The shell 1 has a housing 2 on axis X defined by a portion in relief 5 that projects from the inside surface of the shell 1 and that communicates with the inside of the tank via a top opening 3 and via a lateral passage 4 on axis Y that is perpendicular to X.

The portion in relief 5 in the embodiment described is obtained by giving a suitable shape to the blow mold.

In a variant that is not shown, the portion in relief 5 is obtained by overmolding an insert (not shown) that is placed in the blow mold.

During blowing, the shell that derives from the paraison becomes pressed against the insert and substantially takes up its shape.

By giving the insert a special shape, it is possible to make a portion in relief of the kind shown in FIG. 1, that is suitable for securing an add-on element inside the tank, as described below.

In another variant, the shell 1 is made by injection molding, and the portion in relief 5 is obtained by the shape of the mold.

In another variant shown in FIG. 7, the portion in relief 5 is formed by a fastener 9 which is fitted to the inside surface of the shell 1 and is heat-sealed thereto.

The portion in relief 5 presents a front face 5a which, when observed along the axis X of the housing 2 forms a U-shape with the ends of its two limbs 5f and 5g being folded towards each other so as to form the lateral passage 4, which passage is defined by two surfaces 4a and 4b that are parallel to the axis Y.

Figure 3:
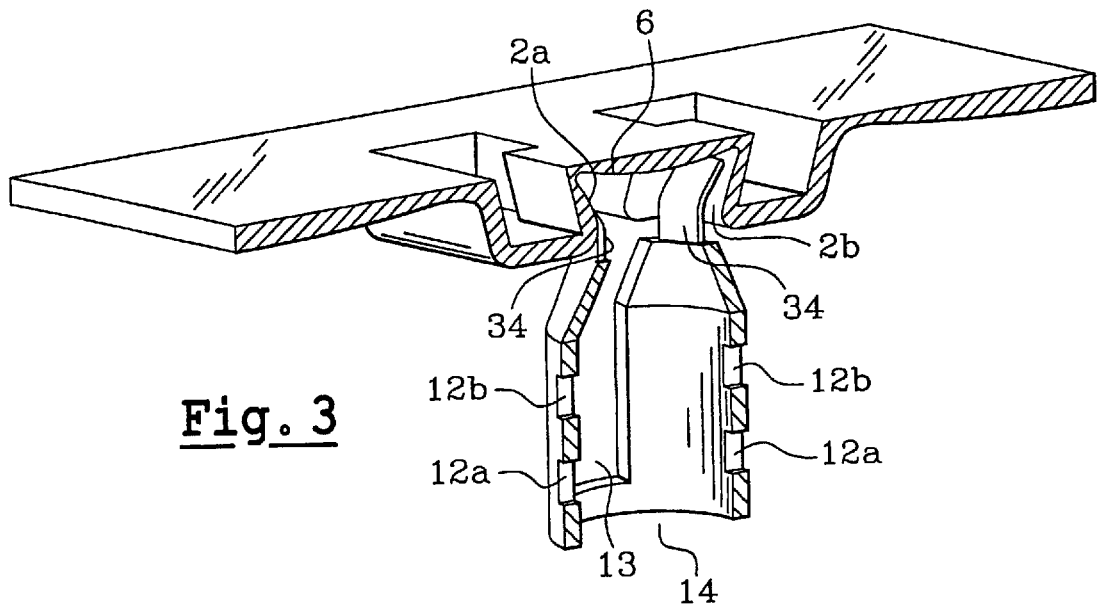
FIG. 3 is a diagrammatic section view of the FIG. 1 housing, the intermediate element of FIG. 2 being shown in placed in the housing.

The housing 2 is laterally defined by two opposite faces 2a and 2b that diverge towards the bottom 6 of the housing, as can be seen in FIG. 3.

In cross-section perpendicular to the axis Y, the housing 2 presents a dovetail shape.

Figure 2:
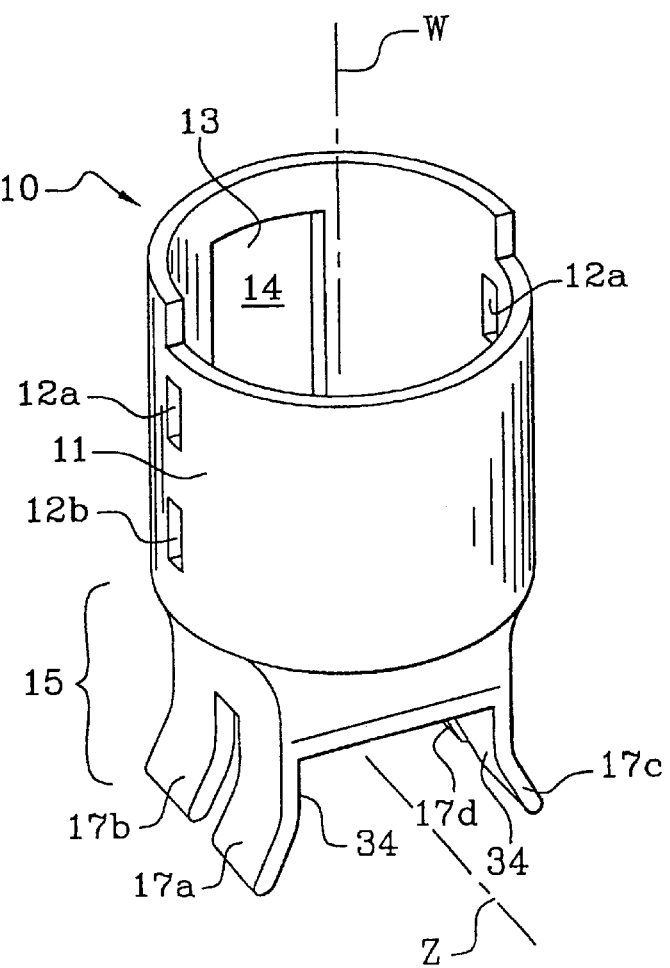
FIG. 2 is a diagrammatic perspective view of an intermediate element for engaging in the FIG. 1 housing.

FIG. 2 shows an intermediate element 10 suitable for connection in the housing 2.

The intermediate element 10 has a substantially tubular body 11, and at the bottom end of the body 11, it has a deformable portion 15.

The top end of the body 11 has a circular opening 14.

In the example described, the body 11 is circular in cross-section on an axis W, and passing through it there are pairs of recesses 12a and 12b and a longitudinal window 13.

The two recesses 12a are diametrically opposite. The same is true of the recesses 12b.

The recesses 12a are situated close to the opening 14, the recesses 12b being axially further away therefrom.

Each of the recesses 12a is situated on the same generator line of the body 11 as is one of the recesses 12b.

Figure 4:
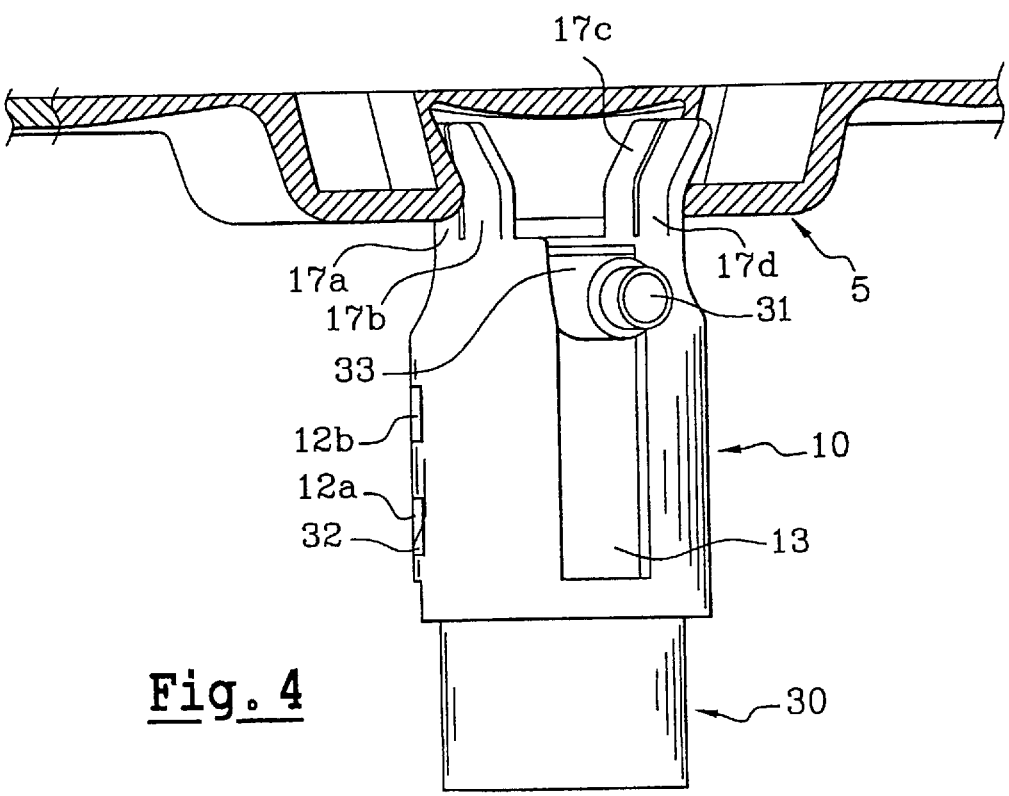
FIG. 4 is a diagrammatic view of an add-on element preassembled with the intermediate element.
Figure 5:
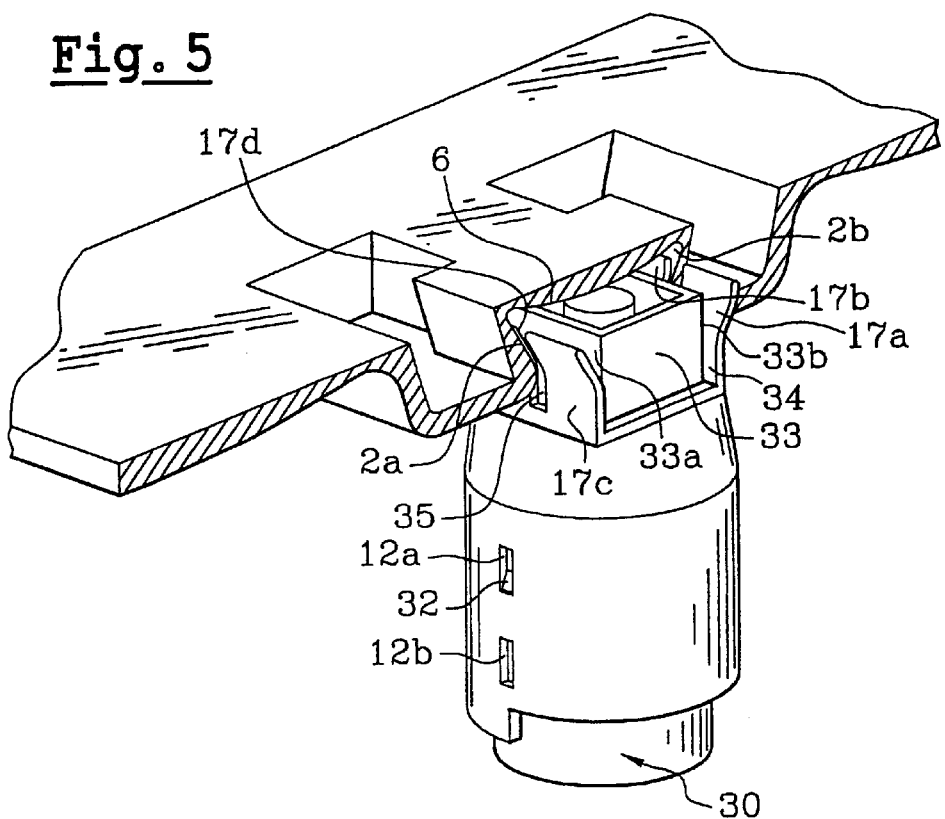
FIG. 5 is a diagram showing the add-on element finally connected in the intermediate element.
Figure 6:
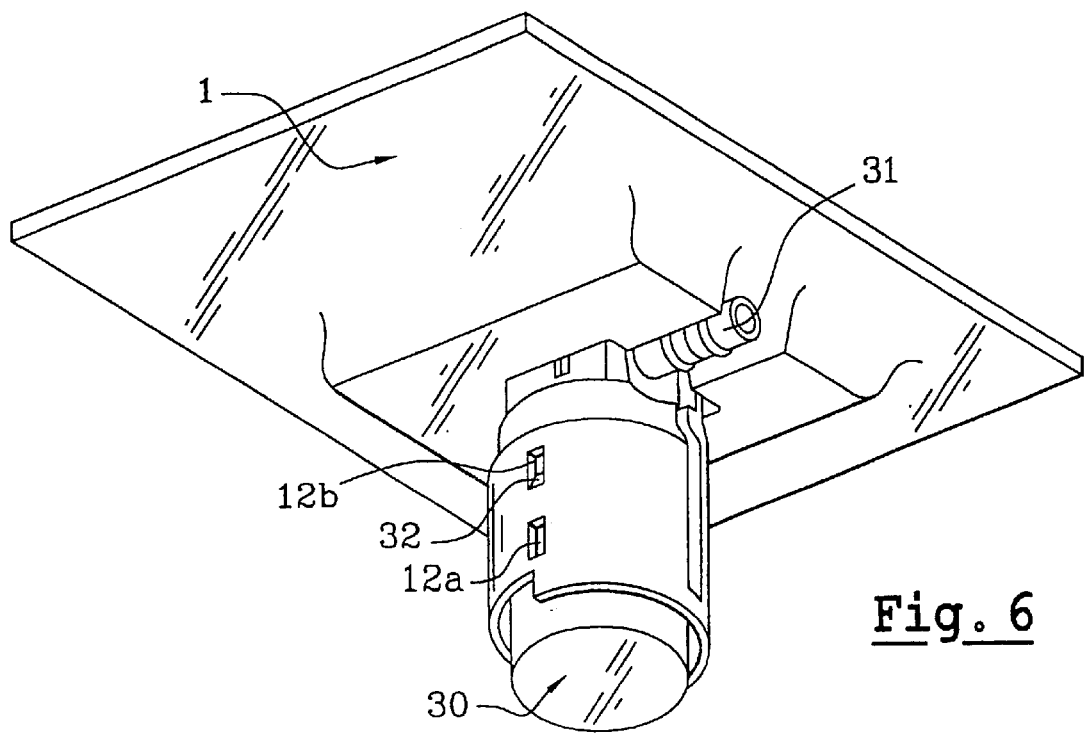
FIG. 6 is a fragmentary diagrammatic view in perspective of the shell of the tank fitted with the intermediate element and the add-on element.

The intermediate element 10 is designed to receive an add-on element 30, constituted in the example described by a valve, as can be seen in particular in FIGS. 4 to 6.

The add-on element 30 has an endpiece 31 for connection to a pipe (not shown).

The deformable portion 15 has four resilient tabs 17a to 17d formed integrally with the body 11 of the intermediate element 10 by molding a plastics material.

Each of the tabs 17a to 17d is flattened in shape being angled outwards, with the fold lines in the tabs extending parallel to the axis Z, and perpendicularly to the axis X of the body 11.

The tabs 17a & 17b and 17c & 17d are grouped together in pairs in alignment with each other, each pair of tabs being designed to come into contact with one of the faces 2a or 2b of the housing 2.

The tabs 17a to 17d can deform elastically to pass through the opening 3 of the housing 2 and then return to their initial shape so as to press against the faces 5a and 5b of the housing, thereby holding the intermediate element 10 against the shell 1 of the tank.

When the intermediate element 10 is in place in the housing 2, the regions of the tabs 17a to 17d which extend beneath their fold lines come into contact with the faces 2a and 2b of the housing 2 and oppose any disengagement of the intermediate element 10.

The axis Z is then substantially parallel to the axis Y, and the axis X is substantially parallel to the axis X.

In addition, the width of the tabs constituting each pair and the spacing between them are selected in such a manner that the intermediate element 10 is prevented from moving in the Y axis direction in the portion in relief 5 between the base 5h of the U-shape and the inwardly curved ends of the limbs 5f and 5g of the U-shape.

As mentioned above, the add-on element 30 is arranged to engage in the intermediate element 10.

At its end which is inserted into the intermediate element 10, the add-on element 30 has a portion 33 presenting two opposite faces 33a and 33b for pressing against the facing faces 34 of the tabs 17a to 17d.

Thus, when the portion 33 is engaged in the gap that extends between these tabs, the tabs are prevented by the portion 33 from deforming towards each other, thereby locking the intermediate element 10 in the housing 2.

Furthermore, the add-on element 30 has two diametrically opposite teeth 32 suitable for snap-fastening either in the recesses 12a, or in the recesses 12b, depending on whether the add-on element 30 is inserted partially or completely into the intermediate element 10.

The add-on element 30 can be put into place in two different ways.

A first way consists in initially securing the intermediate element 10 on its own in the housing 2, as shown in FIG. 3.

Thereafter, the add-on element 30 is installed in the intermediate element 10.

To do this, the endpiece 31 is initially engaged in the window 13 and the endpiece 31 is slid until it engages between the faces 4a and 4b of the passage 4.

The axis of the endpiece 31 is then substantially parallel to the axis Y, as can be seen in FIG. 6.

The teeth 32 engage in the recesses 12b and the faces 33a and 33b of the portion 33 then press against the faces 34 of the tabs thus locking the intermediate element 10 in the housing 2.

A second way of connecting the add-on element 30 to the tank shell is to begin by preassembling the add-on element 30 together with the intermediate element 10 by inserting the endpiece 31 into the window 13 and engaging the add-on element 30 in the intermediate element 10 until the teeth 32 snap into the recesses 12a.

Thereafter, the intermediate element 10 is inserted into the housing 2, with the tabs 17a to 17d deforming elastically to pass through the opening 3 of the housing 2.

FIG. 4 shows the relative positions of the various elements at the end of this step.

Finally, the add-on element 30 is pushed towards the housing 2 so that the teeth 32 snap-fasten in the recesses 12b and the portion 33 of the add-on element 30 engages in the gap between the tabs 17a and 17d.

This leads to the configuration shown in FIGS. 5 and 6.

The spacing between the faces 4a and 4b preferably corresponds substantially to the outside diameter of the pipe that is to be mounted on the endpiece 31.

The portion 33 of the add-on element 30 has teeth 35 which snap against respective edges of the slots between the pairs of tabs 17a & 17b or 17c & 17d.

When the add-on element 30 is observed on the axis of the endpiece 31, the teeth 35 present surfaces that converge towards the end wall of the housing 6.

By coming to bear against the edges of the opening 3 in the housing 2, these surfaces contribute to preventing the intermediate element 10 from moving axially in the housing 2, thus making it possible to avoid having any axial clearance, thereby avoiding wear and the noise that would result from residual assembly clearance between the intermediate element 10 and the shell 1 of the tank.

Naturally, the invention is not limited to the embodiments described above.

In particular, an intermediate element of the invention can be used to connect any type of add-on element other than a valve, e.g. a pump, a filter, or a fuel gauge element.

Furthermore, the invention is not limited to one particular shape of portion in relief for connecting the intermediate element and the add-on element.

Thus, the shape of the portion in relief can be varied so as to form a housing having an opening that is circular, for example optionally interrupted by the passage for a lateral extension on the add-on element, e.g. an endpiece.

FIG. 8 shows a tank shell that includes a portion in relief 41 defining a housing 40 that is provided with a circular top opening 43.

The portion in relief 41 can be obtained in various different ways, as described for the portion in relief 5.

In the example of FIG. 8, the portion in relief 41 has an annular wall that is interrupted so as to form a lateral passage 42 that is to receive an endpiece, like the passage 4 described above.

In a variant, as shown in FIG. 9, the portion in relief 41' has an annular wall that is continuous.

It is also possible to change the way in which the add-on element is connected to the intermediate element, and also the shape of the elastically-deformable portion of the intermediate element.

FIG. 10 shows an intermediate element 101 suitable for engaging in the housing 40, that is substantially analogous to the intermediate element 10 and that differs therefrom by the fact that the elastically-deformable portion 15' is tubular being circularly-symmetrical about the axis W.

The deformable portion 15' has four tabs 17' analogous to the above-described tabs 17a to 17d but disposed at equal angular intervals around the axis X.

The portion in relief of the shell can also be formed by one or more tabs themselves optionally defining between them a housing suitable for receiving a portion of the intermediate element.

What is claimed is:

1. A motor vehicle fuel tank comprising a shell, and inside the shell at least one add-on element such as a valve, wherein the shell presents a portion in relief, wherein the add-on element is connected to the shell by means of an intermediate element including at least one elastically-deformable portion arranged to engage, after being elastically-deformed, in or on said portion in relief so as to hold the intermediate element to the shell, and wherein the add-on element is arranged so as to be connected to the intermediate element in such a manner as to prevent the elastically-deformable portion of the intermediate element from being subjected to inverse elastic deformation enabling it to become disengaged from said portion in relief.

2. A tank according to claim 1, wherein said portion in relief defines a housing in which the elastically-deformable portion of the intermediate element is suitable for being engaged.

3. A tank according to claim 2, wherein the housing communicates with a lateral passage enabling a lateral extension of the intermediate element or of the add-on element to be received.

4. A tank according to claim 3, wherein the lateral extension is constituted by an endpiece on the add-on element.

5. A tank according to claim 4, wherein the passage is defined by walls that are substantially parallel to the axis of the endpiece.

6. A tank according to claim 2, wherein the opening of the housing through which the intermediate element is inserted is not circularly-symmetrical.

7. A tank according to claim 2, wherein the opening of the housing is circularly-symmetrical.

8. A tank according to claim 2, wherein the intermediate element is arranged to snap into said housing in the axial direction thereof.

9. A tank according to claim 2, wherein the intermediate element includes elastically-deformable connection tabs suitable for snap-fastening in the housing.

10. A tank according to claim 2, wherein the intermediate element has at least two resilient tabs leaving a gap between them and arranged to snap-fasten in the housing, and wherein the add-on element includes a portion suitable for engaging in said gap so as to prevent the tabs from moving towards each other and becoming disengaged from the housing.

11. A tank according to claim 10, wherein the intermediate element has two pairs of resilient tabs, facing each other, the tabs in any one pair being placed in such a manner as to come into contact with the same face of the housing.

12. A tank according to claim 10, in which the intermediate element extends along a longitudinal axis and wherein the intermediate element includes a plurality of resilient tabs disposed at equal angles around said longitudinal axis.

13. A tank according to claim 9, wherein the housing has a section of dovetail shape, and wherein the tabs are flat in shape, being angled outwards so as to match substantially the shape of the inside faces of the housing.

14. A tank according to claim 1, wherein the add-on element is arranged to snap-fasten to the intermediate element.

15. A tank according to claim 1, wherein the intermediate element has a tubular body with the elastically-deformable portion at one end, and wherein the add-on element is arranged to be connected inside said tubular body.

16. A tank according to claim 1, wherein the intermediate element and the add-on element have portions in relief that are arranged to co-operate and to allow the add-on element to be preassembled in the intermediate element prior to connection thereof to the shell of the tank.

17. A tank according to claim 15, wherein the intermediate element has a tubular body with the elastically-deformable portion at one end, wherein the add-on element is arranged to be connected inside said tubular body, and wherein the tubular body of the intermediate element includes recesses and the add-on element has teeth suitable for snap-fastening in said recesses.

18. A tank according to claim 16, wherein the intermediate element has a first set of recesses disposed in such a manner as to enable the add-on element to be held in a first position relative to the intermediate element suitable for enabling the intermediate element to be put into place on the shell of the tank, and a second set of recesses enabling the add-on element to be held in the intermediate element in a second position relative to the intermediate element, said second position of the add-on element preventing the intermediate element from becoming detached from the shell of the tank.

19. A tank according to claim 15, wherein the intermediate element and the add-on element have portions in relief that are arranged to co-operate and to allow the add-on element to be preassembled in the intermediate element prior to connection thereof to the shell of the tank, wherein the add-on element has an endpiece, and wherein the tubular body includes a window for passing said endpiece.

20. A tank according to claim 19, wherein the window is set back from the end of the tubular body that is remote from the elastically-deformable portion.

21. A tank according to claim 1, wherein the shell is made by blowing a thermoplastic material.

22. A tank according to claim 21, wherein the shell includes at least one layer that forms a barrier against hydrocarbons.

23. A tank according to claim 21, wherein the portion in relief is obtained by means of a predetermined shape given to the blow mold.

24. A tank according to claim 21, wherein the portion in relief is obtained by overmolding an insert.

25. A tank according to claim 1, wherein the portion in relief is obtained by fitting a connection member to the surface of the shell.

26. A tank according to claim 25, wherein said connection member is heat-sealed to said surface.

27. A tank according to claim 1, wherein the add-on element is constituted by a valve.

28. A method of manufacturing a motor vehicle fuel tank, the method including the following steps:

a) making a shell by shaping a plastics material, in particular by blowing, thermoforming, rotomolding, or injection molding a thermoplastic material;

b) making a portion in relief on the shell, during or after formation of the shell;

c) connecting an intermediate element to said portion in relief, the intermediate element being provided with at least one elastically-deformable portion arranged to engage by resilient deformation in or on said portion in relief so as to hold the intermediate element to the shell; and d) connecting an add-on element to the shell of the tank at the same time as the intermediate element or thereafter, said add-on element being suitable for preventing the elastically-deformable portion of the intermediate element from moving in such a manner as to enable it to become disengaged from said portion in relief.

29. A method according to claim 28, wherein the add-on element is connected to the intermediate element after the intermediate element has been put into place on the shell of the tank so as to prevent the elastically-deformable portion of the intermediate element from performing a movement that enables it to become disengaged from said portion in relief.

30. A method according to claim 28, wherein the add-on element and the intermediate element are preassembled before the intermediate element is put into place on the portion in relief, wherein the intermediate element is then connected to the portion in relief, and wherein the add-on element is finally moved relative to the intermediate element in such a manner that the add-on element prevents the elastically-deformable portion of the intermediate element from moving in such a way as to enable it to become disengaged from said portion in relief.

* * * * *